US009574893B2

(12) United States Patent
Kim

(10) Patent No.: US 9,574,893 B2
(45) Date of Patent: Feb. 21, 2017

(54) APPARATUS AND METHOD OF GUIDING USER ALONG TRAVEL PATH BY USING GPS INFORMATION

(71) Applicant: SAMSUNG ELECTRONICS CO., LTD., Suwon-si, Gyeonggi-do (KR)

(72) Inventor: Jun-mo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/502,081

(22) Filed: Sep. 30, 2014

(65) Prior Publication Data
US 2015/0112587 A1 Apr. 23, 2015

(30) Foreign Application Priority Data
Oct. 21, 2013 (KR) .................. 10-2013-0125549

(51) Int. Cl.
*G01C 21/36* (2006.01)
*G06T 3/00* (2006.01)

(52) U.S. Cl.
CPC ....... *G01C 21/3605* (2013.01); *G01C 21/3647* (2013.01); *G06T 3/0068* (2013.01); *G06T 2200/24* (2013.01)

(58) Field of Classification Search
CPC . G01C 21/3605; G01C 21/343; G01C 21/362; G01C 21/3623; G06T 3/0068; G06T 19/003
See application file for complete search history.

(56) References Cited

U.S. PATENT DOCUMENTS

| 2010/0093365 | A1* | 4/2010 | Bloebaum | G06F 17/30265 |
| | | | | 455/456.1 |
| 2010/0231751 | A1 | 9/2010 | Obradovich | |
| 2013/0061147 | A1* | 3/2013 | Beaurepaire | 715/738 |

* cited by examiner

*Primary Examiner* — Basil T Jos
(74) *Attorney, Agent, or Firm* — Drinker Biddle & Reath LLP

(57) ABSTRACT

An apparatus and a method of guiding a user along a travel path by using global positioning system (GPS) information are described. The method includes aligning images in a selected order based on a user input; extracting location information of the aligned images; setting a travel destination and a travel sequence based on the location information extracted from the aligned images; obtaining the user's location by using the global positioning system (GPS); and guiding the user along a travel path to the travel destination based on the user's location.

14 Claims, 10 Drawing Sheets

APPARATUS AND METHOD OF GUIDING USER ALONG TRAVEL PATH BY USING GPS INFORMATION

CROSS-REFERENCE TO RELATED PATENT APPLICATION

This application claims the priority benefit of Korean Patent Application No. 10-2013-0125549, filed on Oct. 21, 2013, in the Korean Intellectual Property Office, the disclosure of which is incorporated herein in its entirety by reference.

BACKGROUND

1. Field

One or more embodiments of the present disclosure relate to apparatuses and methods of guiding users along travel paths by using global positioning system (GPS) information, and more particularly to apparatuses and methods of guiding users along travel paths by using GPS information included in images.

2. Related Art

Currently, various additional functions are being included in digital imaging apparatuses according to technological advancements in the field.

For example, as illustrated in FIG. 1, when a digital imaging apparatus 10 includes a global positioning system (GPS) function, GPS information received from a GPS satellite 20 may be provided when taking the photograph. Accordingly, image capture location information about where a user is taking a photograph is provided by being incorporated into image information such as an exchangeable image file format (exif) and then the digital imaging apparatus 10 may use the image capture location information to track the image capture location and indicate it on a map.

However, to provide the GPS information on the digital imaging apparatus 10, the digital imaging apparatus 10 needs to include map data for identifying the image capture location, which takes up a large amount of memory space and thus, the applicability thereof is limited. That is, the GPS information has been used in a passive manner by inputting the image capture location information into the image information and identifying the image capture location later.

Accordingly, for an apparatus that uses the GPS, such as the digital imaging apparatus 10, there is a need to improve the applicability of the GPS information.

SUMMARY

Various embodiments of the present disclosure include apparatuses and methods for guiding users along paths by using global positioning system (GPS) information incorporated in images by aligning images related to travel destinations in travel paths to improve applicability of GPS apparatuses and user convenience.

One or more embodiments of the present disclosure may further include a method of guiding a user along a travel path by using a global positioning system (GPS), the method including aligning images in a selected order based on a user input; extracting location information of the aligned images; setting a travel destination and a travel sequence based on the location information extracted from the aligned images; obtaining the user's location by using the global positioning system (GPS); and guiding the user along a travel path to the travel destination based on the user's location.

Additional features will be set forth in part in the description which follows and, in part, will be apparent from the description, or may be learned by practice of the presented embodiments.

According to an embodiment, the guiding of the user may include displaying the travel path to the travel destination set from the user's location on a map.

According to another embodiment, the guiding of the user may include determining whether the user has arrived at the travel destination when the user's location is within a predetermined range of the travel destination.

According to another embodiment, the guiding of the user may include displaying a pop-up window that prompts whether the user wishes to be guided to a subsequent travel destination when the user's location is determined to be within the predetermined range of the travel destination.

According to another embodiment, the aligning may include receiving images of the travel destination in a same storage location of a digital imaging apparatus.

According to another embodiment, the aligning of the images may include displaying images including GPS information in a random order; and aligning the displayed images in the selected order based on the user input.

According to another embodiment, the aligning of the displayed images may include setting a travel starting location based on the GPS information of the displayed images and the user input; and aligning the displayed images from the nearest to the farthest from the travel starting location.

According to another embodiment, the aligning of the images may include setting an accommodation based on the user input.

According to another embodiment, the setting of the travel destination and a travel sequence may include setting a one day travel schedule based on the accommodation.

According to another embodiment, the guiding of the user may include displaying a pop-up window related to termination of the one day travel schedule when the user's location is determined to be within a predetermined range of the accommodation.

According to another embodiment of the present disclosure, an apparatus for guiding a user along a travel path is described. The apparatus may include a digital imaging apparatus that guides the user along the travel path by using global positioning system (GPS) information; an image aligning unit that aligns images in a selected order based on a user input; a location extracting unit that extracts location information of the aligned images; a setting unit that sets a travel destination and a travel sequence based on the location information extracted from the aligned images; a GPS unit that obtains location information for the user's location by using a GPS; and a travel path guidance unit that guides the user along the travel path to the travel destination set based on the user's location.

According to another embodiment, the travel path guidance unit may display a travel path from the user's location to the travel destination on a map.

According to another embodiment, the travel path guidance unit may determine that the user has reached the travel destination when the user's location is within a predetermined range of the travel destination.

According to another embodiment, the travel path guidance unit may display a pop-up window that prompts whether the user wishes to be guided to a subsequent travel destination when the user's location is determined to be within the predetermined range of the travel destination.

According to another embodiment, the image aligning unit may display images that include GPS information in a random order and align displayed images in the selected order based on the user input.

According to another embodiment, the image aligning unit may set a travel starting location based on the GPS information of the displayed images and align the displayed images from the nearest to the farthest from the travel starting location.

According to another embodiment, the image aligning unit may set an accommodation based on the user input.

According to another embodiment, the image aligning unit may set a one day travel schedule based on the accommodation.

According to another embodiment, the travel path guidance unit may display a pop-up window related to the termination of the one day travel schedule when the user's location is determined to be within a predetermined range of the accommodation.

Also, according to another embodiment, a non-transitory recording medium having recorded thereon a computer-readable program for processing a method of guiding a user along a travel path by using a global positioning system (GPS), the method including aligning images in a selected order based on a user input; extracting location information of the aligned images; setting a travel destination and a travel sequence based on the location information extracted from the aligned images; obtaining the user's location by using the global positioning system (GPS); and guiding the user along a travel path to the travel destination based on the user's location.

BRIEF DESCRIPTION OF THE DRAWINGS

These and/or other embodiments will become apparent and more readily appreciated from the following description of various embodiments, taken in conjunction with the accompanying drawings of which.

DETAILED DESCRIPTION

Figure 1:
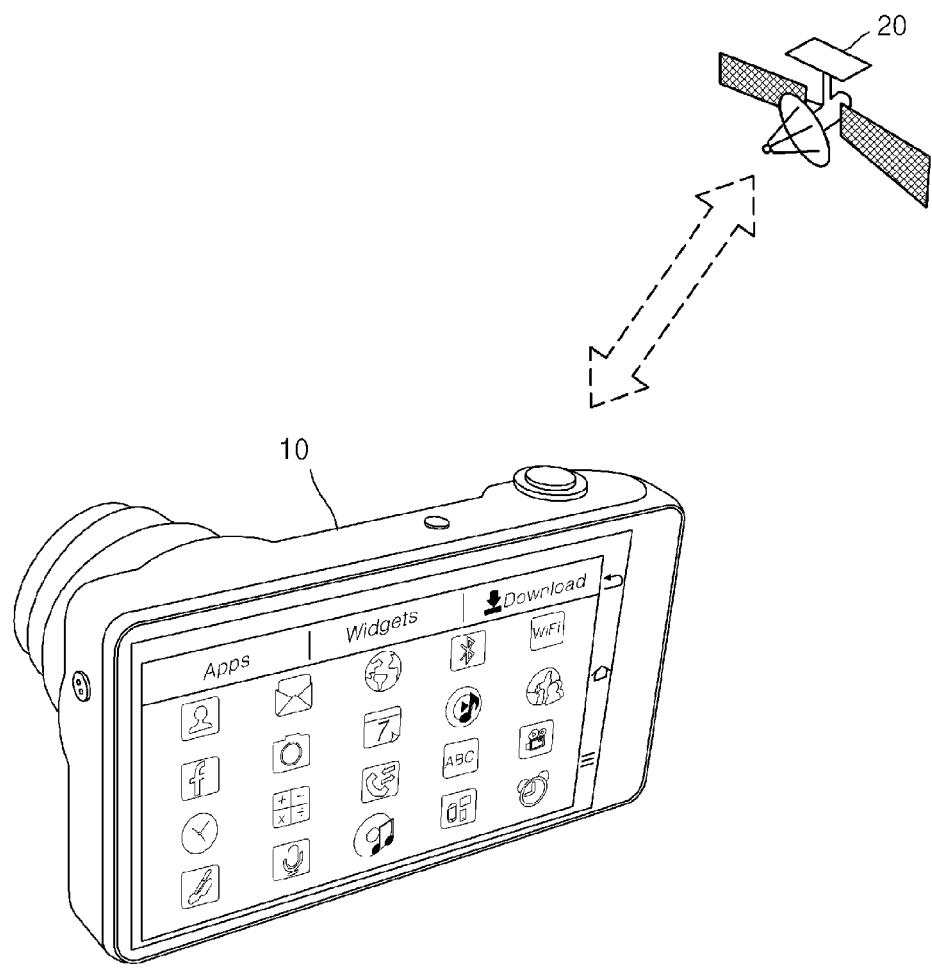
FIG. 1 illustrates an example of a digital imaging apparatus of the prior art that uses global positioning system (GPS) information.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various features of the present disclosure. Expressions such as "at least one of," when preceding a list of elements, modify the entire list of elements and do not modify the individual elements of the list.

Hereinafter, various methods for manufacturing and various methods for using the present disclosure are described in detail. As used herein, terms such as "... part" and "module" refer to units that process at least one function or operation, which may be embodied as hardware or software, or a combination thereof.

As used herein, "one embodiment" or an "embodiment" of the present disclosure refers to properties, structures, features, and the like, that are described in relation to an embodiment that is included in at least one embodiment of the present disclosure. In this regard, expressions such as "in one embodiment" and "in an embodiment" in the present disclosure do not all refer to the same embodiment.

Hereinafter, embodiments of the present disclosure are described in detail with reference to the drawings.

Figure 2:
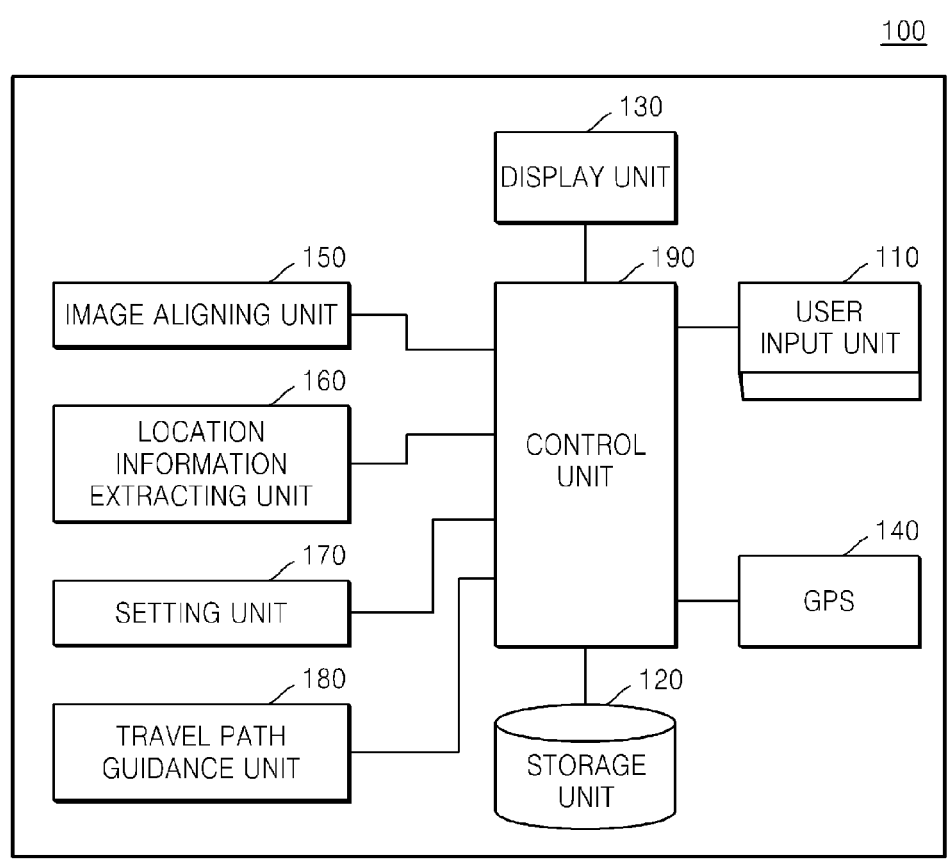
FIG. 2 is a block diagram for describing a structure of an apparatus for guiding a user along a path by using GPS information according to an embodiment.

FIG. 2 is a block diagram illustrating one example of a structure of a path guidance apparatus 100 for guiding a user along a path by using global positioning system (GPS) information, according to an embodiment. In alternative embodiments, the path guidance apparatus 100 is combined with an instance of the digital imaging apparatus 10.

The path guidance apparatus 100 of FIG. 2 illustrates various features related to present embodiments, but is not limited thereto. Accordingly, one of ordinary skill in the art related to the present embodiments may understand that various features other than the features illustrated in FIG. 2 may be included. Also, the path guidance apparatus 100 according to an embodiment may be a digital imaging device, such as a digital camera. However, the path guidance apparatus 100 is not limited thereto and may be any suitable device that uses GPS information along with mobile devices such as smart phones, tablets, personal computers (PCs), and the like. Also, the path guidance apparatus 100 may be included in a digital imaging apparatus or a mobile device as one module.

Referring to FIG. 2, the path guidance apparatus 100 according to an embodiment may include a user input unit 110, a storage unit 120, a display unit 130, a GPS 140, an image aligning unit 150, a location information extracting unit 160, a setting unit 170, a travel path guidance unit 180, and a control unit 190.

The user input unit 110 according to an embodiment provides user input to the path guidance apparatus 100. Accordingly, the user input unit 110 may include various input devices such as a touch panel, keys, or buttons, which allow inputting of desired information by a user.

A storage unit 120 according to an embodiment may store images for guiding a user along a travel path. Here, the storage unit 120 may include a non-volatile storage device that stores digital data, such as a flash memory or a hard disk drive (HDD).

However, an image file may be generated according to an exchangeable image file format (exif) standard. Accordingly, image data and detailed additional information such as one or more of a device manufacturer, a device model, image editor software, a date/time (e.g., timestamp) of editing an image, an exif version, an image capture date/time, an actual size of an image uploaded on a website, an exposure time (shutter speed), an exposure program, a focal length of a lens, an F-number of a diaphragm, or use of a flash of the digital imaging apparatus 10 may be recorded according to a predetermined setting in the exif information included in the image file. Accordingly, the image file may include the GPS information.

A display unit 130 according to an embodiment may include a feature for visually displaying a screen, such as a liquid crystal display (LCD) and light-emitting diode (LED) module. Accordingly, image files stored in the storage unit 120 may be displayed on the display unit 130.

The global positioning system (GPS) 140 according to an embodiment may obtain the GPS information of the path guidance apparatus 100. In this regard, the GPS information may include latitudinal or longitudinal information and standard time information corresponding to a certain location. For example, the GPS 140 may track a user location of the path guidance apparatus 100 (e.g., the location of the user of the path guidance apparatus 100).

The image aligning unit 150 according to an embodiment may align images according to travel paths based on the user input.

For example, the user may collect various images related to a travel destination from the Internet when preparing for a trip.

Accordingly, the image aligning unit 150 may receive collected images of the travel destination in a specific or predetermined folder in the storage unit 120. Then, the image aligning unit 150 may display images including the GPS information, from images saved by the user, on the display unit 130.

Thereafter, the image aligning unit 150 may align displayed images in an order according to a travel sequence based on the user input such as a drag input.

As another example, when the user sets the location of one image of the displayed images as a travel starting location, the image aligning unit 150 may align the displayed images in the order of the nearest to the farthest from the travel starting location, based on the GPS information of the images.

Furthermore, the image aligning unit 150 may set an accommodation (e.g., a location of a hotel stay or stopping point) based on the user input.

The location information extracting unit 160 according to an embodiment may extract location information from the aligned images. In more detail, the GPS information from the Exif information included in the images may be extracted to obtain the location information of the aligned images.

The setting unit 170 according to an embodiment may set the travel destination and the travel sequence based on extracted location information of the aligned images. In this regard, when the accommodation (e.g., the location of the hotel) was set beforehand, the setting unit 170 may set a one day travel schedule based on the predetermined accommodation.

The travel path guidance unit 180 according to an embodiment may guide a travel path to the travel destination that was set based on the user's location.

For example, the travel path guidance unit 180 may display the travel path to the travel destination that was set based on the user's location tracked by the GPS 140.

Also, the travel path guidance unit 180 determines whether the user arrived at the set travel destination and when the user is within a predetermined range of the travel destination, the travel path guidance unit 180 may display a pop-up window, which prompts whether the user wishes to be guided to a subsequent travel destination, on a display unit 130.

The control unit 190 according to an embodiment may control one or more of the user input unit 110, the storage unit 120, the display unit 130, the GPS 140, the image aligning unit 150, the location information extracting unit 160, the setting unit 170, or the travel path guidance unit 180 for the path guidance apparatus 100 to perform the operations described above.

Hereinafter, an operation of the path guidance apparatus 100 will be described in greater detail with reference to FIGS. 3 to 12.

Figure 3:
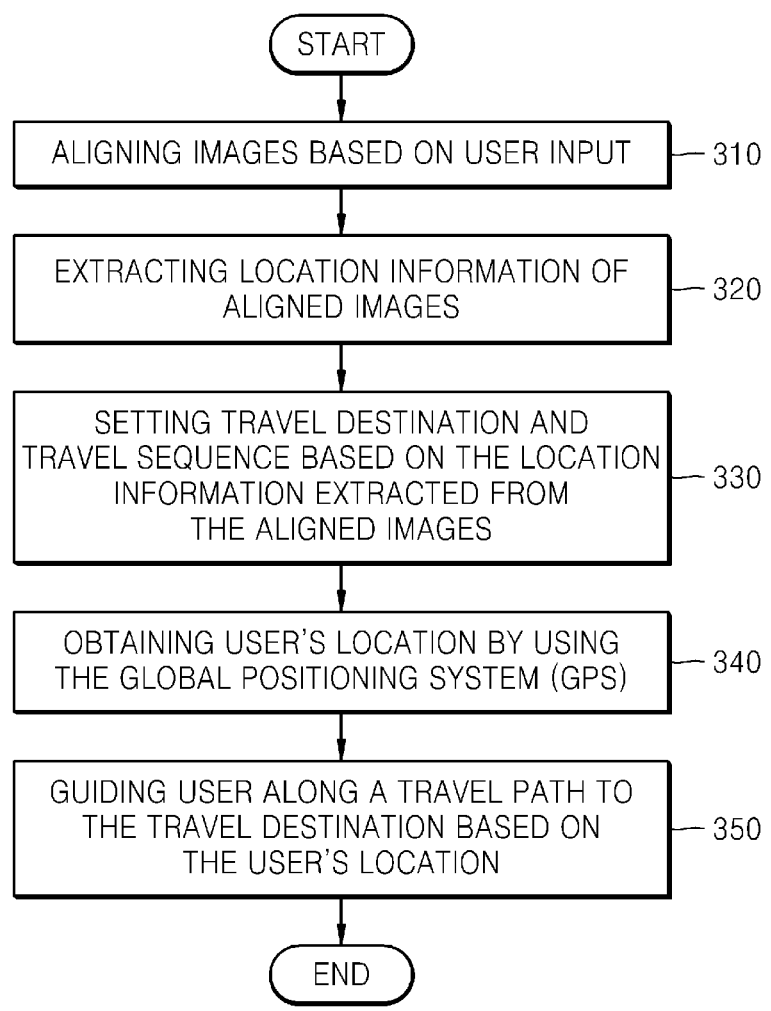
FIG. 3 is a flow chart of a method of guiding a user along a travel path by using GPS information according to an embodiment.

FIG. 3 is a flow chart illustrating a method of guiding a user along a travel path by using GPS information according to an embodiment.

Referring to FIG. 3, in operation 310, the image aligning unit 150 according to an embodiment may align images according to travel paths based on the user input.

Figure 4:
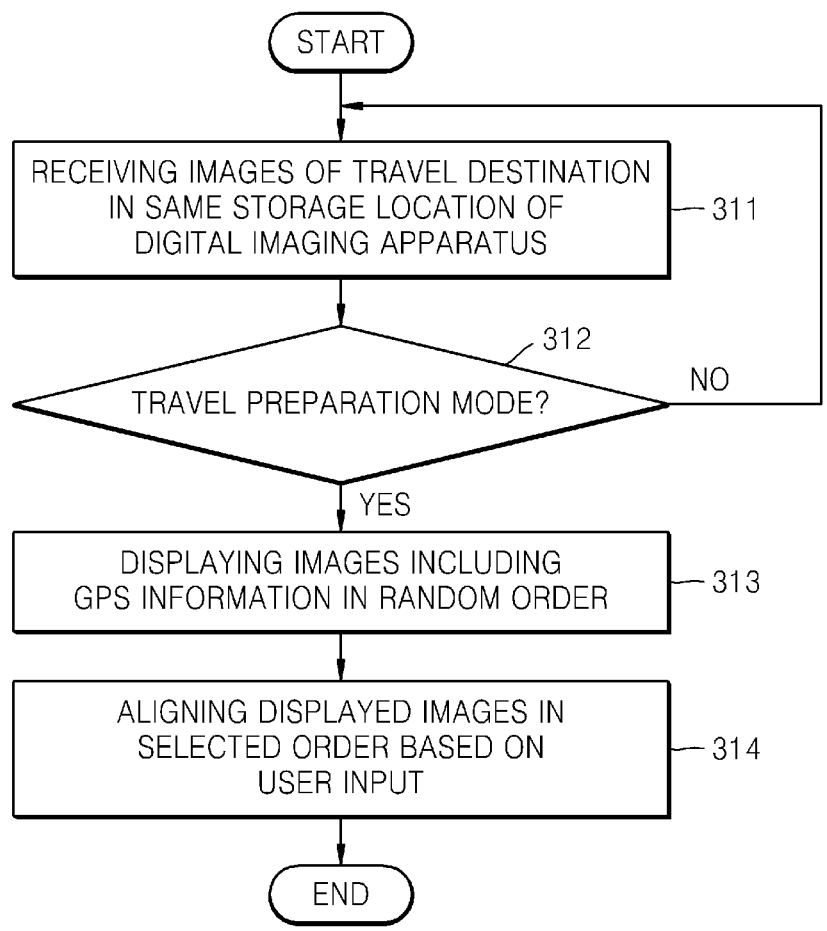
FIG. 4 is a flow chart of a method of aligning images by using an image aligning unit according to travel paths according to an embodiment.

In more detail, FIG. 4 is a flow chart of a method of aligning images according to travel paths by using the image aligning unit 150 according to an embodiment.

In operation 311, the image aligning unit 150 according to an embodiment may receive images of the travel destination, for example, in a same storage location of the digital imaging apparatus 10. For example, the user may collect various images of the travel destination from the internet when preparing for a trip. Also, the collected images may be saved in a predetermined folder of the storage unit 120 of the path guidance apparatus 100.

In operation 312, the image aligning unit 150 according to an embodiment determines whether a travel preparation mode is set, based on the user input. If the travel preparation mode is not set, the image aligning unit 150 continues to receive images of the travel destination, and if the travel preparation mode is set, the image aligning unit 150 proceeds to operation 313.

In operation 313, the image aligning unit 150 according to an embodiment may display images (e.g., of the collected images) including the GPS information in a random order (e.g., an order that is not based on the GPS information). In this regard, the image aligning unit 150 may determine whether the images include the GPS information.

Figure 5:
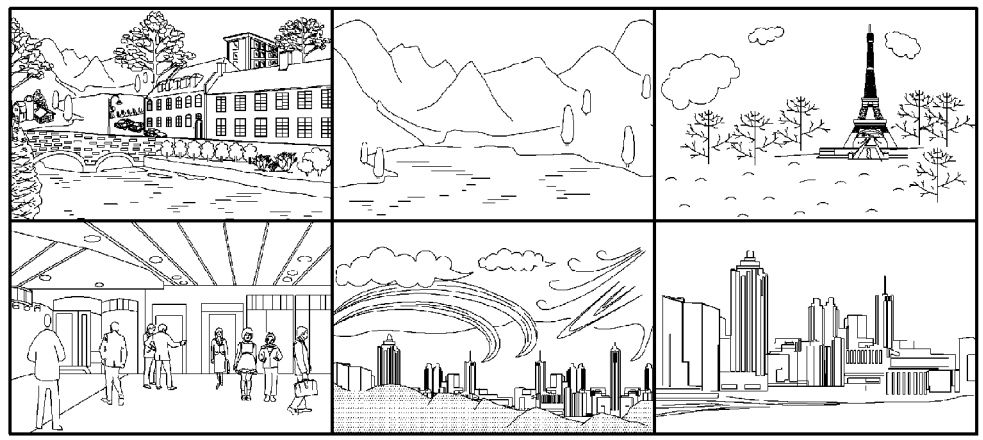
FIG. 5 illustrates an embodiment of a display of images including GPS information displayed in a random order by an image aligning unit.

For example, FIG. 5 illustrates an embodiment of images including the GPS information displayed in a random order by the image aligning unit 150.

As illustrated in FIG. 5, the image aligning unit 150 may display images 500 saved in the predetermined folder of the storage unit 120 in a random order.

Referring back to FIG. 4, in operation 314, displayed images may be aligned in a selected order according to a travel sequence based on the user input.

Figure 6:
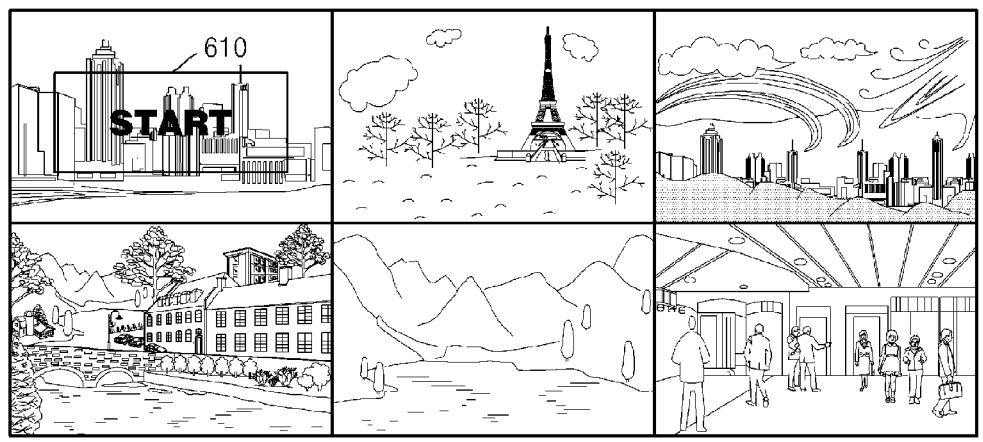
FIG. 6 illustrates an embodiment of an image aligning unit aligning displayed images according to a travel sequence based on a user input.

For example, FIG. 6 illustrates an embodiment of the image aligning unit 150 aligning displayed images according to the travel sequence based on the user input.

Referring to FIG. 6, the image aligning unit 150 may set a location of an image as a travel starting location 610 based on the user input.

Then, the image aligning unit 150 may align displayed images 500 in FIG. 5 from the nearest to the farthest from the travel starting location, and may display aligned images 600 in FIG. 6.

Furthermore, the image aligning unit 150 may additionally change the order of aligned images based on the user input such that the order corresponds to the travel sequence.

Referring back to FIG. 3, in operation 320, the location information extracting unit 160 according to an embodiment may extract location information of the aligned images.

Also, in operation 330, the setting unit 170 according to an embodiment may set the travel destination and the travel sequence based on extracted location information of the images. Accordingly, preparations for a travel path guide may be completed by operations 310 to 330 described above.

Next, a process whereby the user receives guidance from the path guidance apparatus 100 is performed.

In operation 340, the path guidance apparatus 100 according to an embodiment may obtain the user's location (e.g., GPS information) by using the GPS 140. In this regard, the GPS information may include latitudinal or longitudinal information and standard time information of a certain location and may track the location of the user of the path guidance apparatus 100.

In operation 350, the travel path guidance unit 180 according to an embodiment may guide the user along a travel path to the pre-set travel destination based on the user location.

Figure 7:
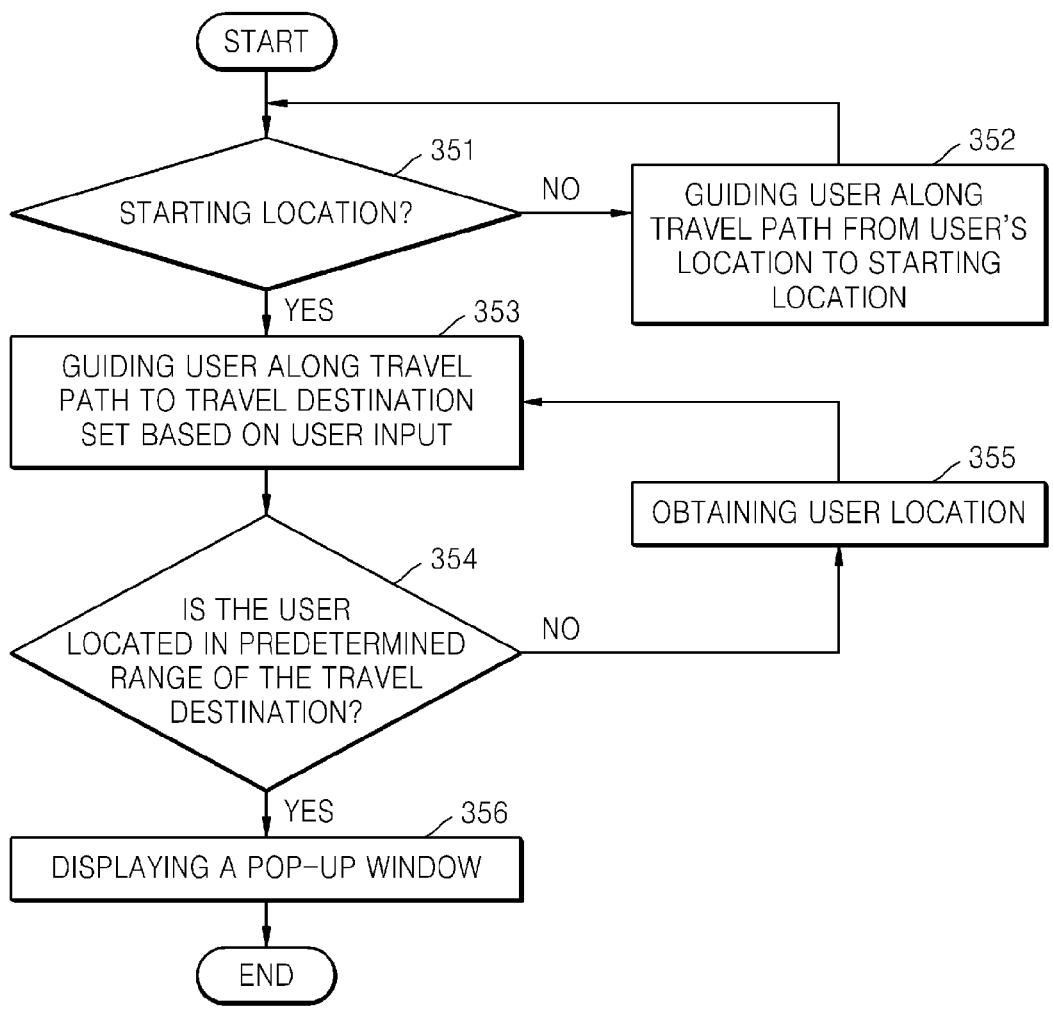
FIG. 7 is a flow chart of a travel path guidance unit guiding a user along a path to a predetermined travel destination based on a user location.

In more detail, FIG. 7 is a flow chart of the travel path guidance unit 180 guiding the user along a path to the predetermined travel destination based on the user location.

Hereinafter, the expression 'locations match' does not refer to the fact that latitudes and the longitudes of the user's location and another location match exactly, but refers to the fact that the user is located within a predetermined range in which the travel path guidance unit 180 may determine that the locations match.

In operation 351, the travel path guidance unit 180 according to an embodiment determines whether the user's location obtained from the GPS 140 matches the travel starting location. When the user's location does not match the travel starting location, the travel path guidance unit 180 proceeds to operation 352 to guide the user along the travel path from the user's location to the travel starting location.

Figure 8:
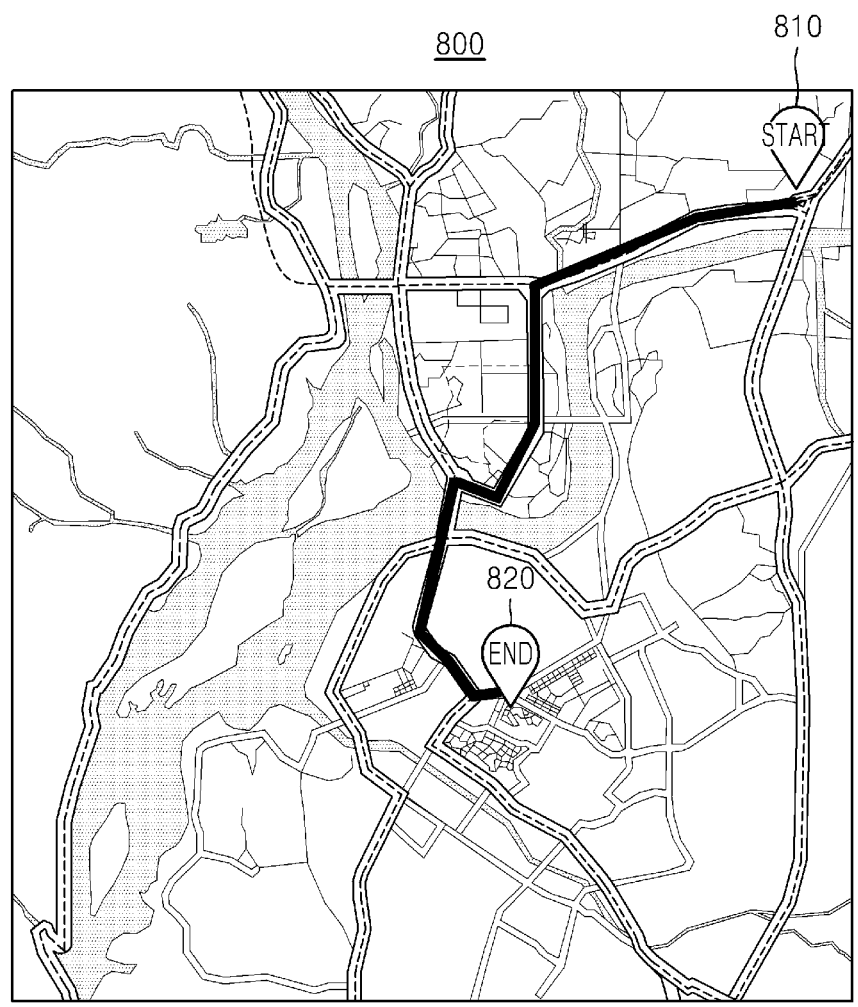
FIG. 8 illustrates a travel path guidance unit, according to an embodiment, displaying a user location, a travel destination, and a path on a map.

For example, FIG. 8 illustrates the travel path guidance unit 180, according to an embodiment, displaying a user's location 810, a travel destination 820, and a travel path on a map 800.

As illustrated in FIG. 8, the travel path guidance unit 180 displays the travel path of the user on the map 800 to guide the user along the travel path to the travel destination.

In operation 353, when the user's location matches the travel starting location, the travel path guidance unit 180 begins to guide the travel path from the user's location to the travel destination set in operation 330. At this point, as illustrated in FIG. 8, the travel path guidance unit 180 may display the travel path of the user on the map 800 to guide the user along the travel path to the travel destination.

However, the travel path guidance unit 180 according to another embodiment may omit the operation of guiding the user along the travel path to the travel destination, according to a user setting. In other words, the path guidance apparatus 100 described above may be a digital imaging apparatus or a mobile device and thus, the path guidance apparatus 100 may display the travel path only when the user requests or activates this feature.

In operation 354, the travel path guidance unit 180 according to an embodiment determines whether the user is located within the predetermined range of the travel destination to determine whether the user has reached the travel destination. If the user has not yet reached the travel destination , the travel path guidance unit 180 proceeds to operation 355 to repeat the operations of the GPS 140 obtaining (i.e., calculating) the user's location and guiding the user from the user's location to the travel destination.

In operation 354, when the travel path guidance unit 180 according to an embodiment determines that the user has reached the predetermined travel destination, the travel path guidance unit 180 may display (356) a pop-up window that asks whether the user wishes to be guided to a subsequent travel destination and notifies the user that the user has arrived at the pre-set travel destination.

Alternatively, when the path guidance apparatus 100 is in a power-saving mode (for example, a sleep mode), the path guidance apparatus 100 provides a pop-up window and alarm sound to notify the user that the user has arrived at the pre-set travel destination.

Figure 9:
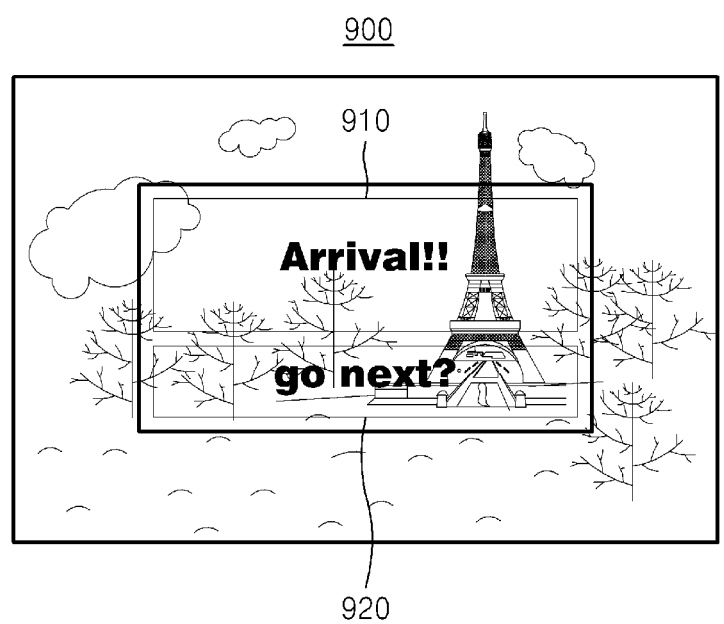
FIG. 9 illustrates a travel path guidance unit, according to an embodiment, displaying a pop up window that asks whether the user wishes to be guided to a subsequent travel destination.

FIG. 9 illustrates the travel path guidance unit 180 according to an embodiment displaying a pop-up window 910 that prompts whether user wishes to be guided to the subsequent travel destination.

Referring to FIG. 9, the travel path guidance unit 180 may display the pop-up window 910 on a display screen 900, which notifies the user that the user has arrived at the travel destination. Also, a selection window 920 may be used to receive a selection from the user as to whether the user wishes to be guided to the subsequent travel destination.

In operation 356, when the user selects guidance to the subsequent travel destination, the travel path guidance unit 180, according to an embodiment, guides the user to the subsequent travel destination. Such a process may be repeated until the user arrives at the final travel destination.

As described above, the path guidance apparatus 100 according to an embodiment may guide the user along the travel path based on the GPS information included in images, simply by aligning images related to the travel destination according to travel paths, to thereby increase applicability of a GPS apparatus and increase user convenience. In other words, cumbersome processes of searching for the travel path and searching for the nearest path for every trip may be avoided.

Figure 10:
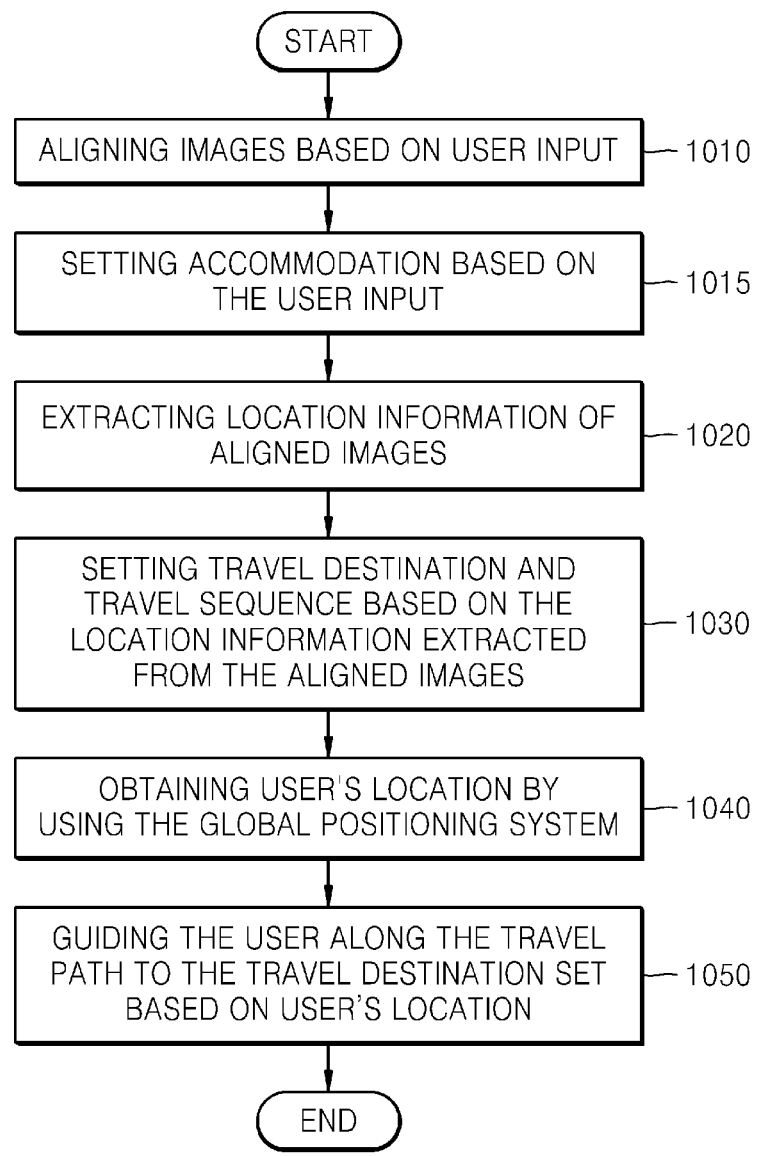
FIG. 10 is a flowchart of a method of guiding a user along a travel path by using GPS information according to another embodiment.

FIG. 10 is a flowchart showing a method of guiding the travel path by using the GPS information according to another embodiment.

The method of guiding the travel path by using GPS information illustrated in FIG. 10 is similar to the method described in FIG. 3 and thus, only the differences therebetween will be described here.

In operation 1010, the image aligning unit 150 according to an embodiment may align images according to travel paths based on the user input.

Then, in operation 1015, the image aligning unit 150, according to an embodiment, may receive selection of an accommodation and set the accommodation (e.g., the location of the accommodation) based on the user input.

Figure 11:
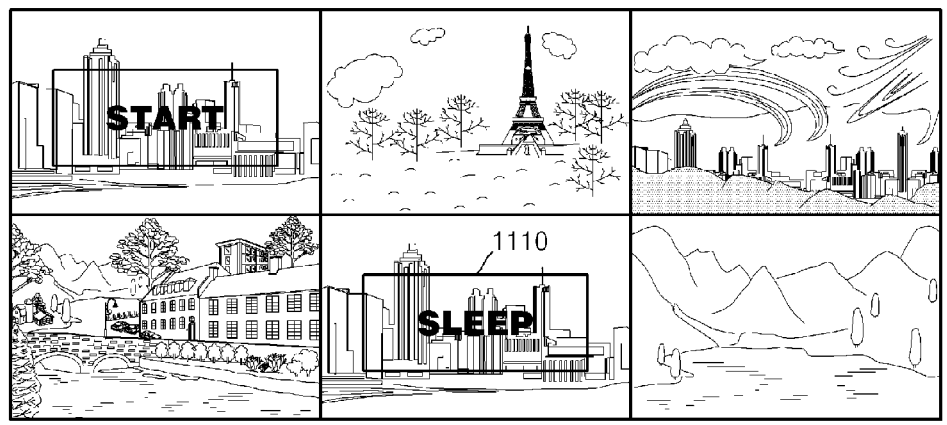
FIG. 11 illustrates an image aligning unit according to an embodiment receiving the selection of accommodation based on user input.

For example, FIG. 11 illustrates the image aligning unit 150, according to an embodiment, receiving the selection of accommodation 1110 based on the user input.

As illustrated in FIG. 11, the accommodation 1110 may be selected from images aligned according to the travel sequences based on the user input. For example, an image of commercial accommodation (e.g., a hotel) in which the user may stay or an image of a specific place may be selected.

When the user goes on a trip, the user usually stays more than one night in the accommodation and thus, the image aligning unit 150, according to an embodiment, may set a one day travel schedule based on pre-set accommodation from the aligned images.

Operations 1020, 1030, 1040, and 1050 may be performed analogously to operations 320, 330, 340, and 350, respectively, as described above and thus, detailed descriptions thereof will be omitted here.

However, in operation 1050, when the travel path guidance unit 180, according to an embodiment, determines that the user's location is within the predetermined range of the pre-set accommodation, the travel path guidance unit 180 may additionally display a pop-up window related to termination of the one-day travel schedule.

Figure 12:
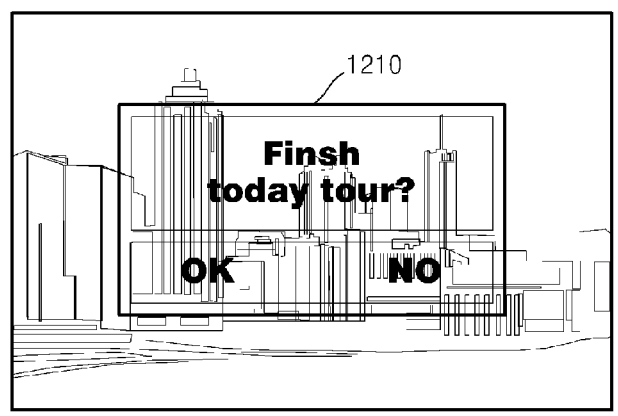
FIG. 12 illustrates a travel path guidance unit, according to an embodiment, displaying a pop-up window related to termination of a one-day schedule.

FIG. 12 illustrates the travel path guidance unit 180, according to an embodiment, displaying a pop-up window 1210 related to the termination of the one-day travel schedule.

Referring to FIG. 12, the travel path guidance unit 180 may display the pop-up window 1210 on a display screen 1200, which notifies the user that the user has arrived at the pre-set accommodation. Also, the pop-up window 1210 may be used to receive the selection of the termination of the one-day travel schedule from the user. Accordingly, the user may more conveniently follow the one day travel schedule.

In addition, other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of guiding a user along a travel path by using a global positioning system (GPS), the method comprising:
    aligning a plurality of images in a selected order based on a user input;
    extracting location information of the aligned images;
    setting a travel destination and a travel sequence based on the location information extracted from the aligned images;
    obtaining the user's location by using the global positioning system (GPS); and
    guiding the user along a travel path to the travel destination based on the user's location,
    wherein the aligning of the displayed images comprises:
    setting a travel starting location based on the GPS information of the displayed images and the user input; and
    aligning the displayed images from the nearest to the farthest from the travel starting location,
    wherein when the user's location matches the travel starting location, start to guide the travel path from the user's location to the travel destination,
    wherein the guiding of the user comprises:
    determining whether the user has arrived at the travel destination when the user's location is within a predetermined range of the travel destination; and
    displaying a pop-up window that prompts whether the user wishes to be guided to a subsequent travel destination when the user's location is determined to be within the predetermined range of the travel destination.

2. The method of claim 1, wherein the guiding of the user comprises displaying the travel path to the travel destination set from the user's location on a map.

3. The method of claim 1, wherein the aligning comprises receiving images of the travel destination in a same storage location of a digital imaging apparatus.

4. The method of claim 1, wherein the aligning of the images comprises:
    displaying images including GPS information in a random order; and
    aligning the displayed images in the selected order based on the user input.

5. The method of claim 1, wherein the aligning of the images comprises setting an accommodation based on the user input.

6. The method of claim 5, wherein the setting of the travel destination and a travel sequence comprises setting a one day travel schedule based on the accommodation.

7. The method of claim 6, wherein the guiding of the user comprises displaying a pop-up window related to termination of the one day travel schedule when the user's location is determined to be within a predetermined range of the accommodation.

8. A non-transitory recording medium having recorded thereon a computer-readable program for processing the method of claim 1.

9. An apparatus for guiding a user along a travel path, comprising:
    a digital imaging apparatus that guides the user along the travel path by using global positioning system (GPS) information;
    an image aligning unit that aligns a plurality of images in a selected order based on a user input;
    a location extracting unit that extracts location information of the aligned images;
    a setting unit that sets a travel destination and a travel sequence based on the location information extracted from the aligned images;
    a GPS unit that obtains location information for the user's location by using a GPS; and
    a travel path guidance unit that guides the user along the travel path to the travel destination set based on the user's location,
    wherein the image aligning unit sets a travel starting location based on the GPS information of the displayed images and aligns the displayed images from the nearest to the farthest from the travel starting location,
    wherein when the user's location matches the travel starting location, start to guide the travel path from the user's location to the travel destination,
    wherein the travel path guidance unit determines that the user has reached the travel destination when the user's location is within a predetermined range of the travel destination, and displays a pop-up window that prompts whether the user wishes to be guided to a subsequent travel destination when the user's location is determined to be within the predetermined range of the travel destination.

10. The apparatus of claim 9, wherein the travel path guidance unit displays a travel path from the user's location to the travel destination on a map.

11. The apparatus of claim 9, wherein the image aligning unit displays images that include GPS information in a random order and aligns displayed images in the selected order based on the user input.

12. The apparatus of claim 9, wherein the image aligning unit sets an accommodation based on the user input.

13. The apparatus of claim 12, wherein the image aligning unit sets a one day travel schedule based on the accommodation.

14. The apparatus of claim 13, wherein the travel path guidance unit displays a pop-up window related to the termination of the one day travel schedule when the user's location is determined to be within a predetermined range of the accommodation.

* * * * *